United States Patent [19]

Defourny

[11] 4,296,304
[45] Oct. 20, 1981

[54] ELECTRODE DISPLACEMENT MONITORING IN RESISTANCE WELDING

[75] Inventor: Jacques Defourny, Herstal, Belgium

[73] Assignee: Centre de Recherches Metallurgiques-Centrum voor Research in de Metallurgie, Brussels, Belgium

[21] Appl. No.: 943,798

[22] Filed: Sep. 19, 1978

[30] Foreign Application Priority Data

Sep. 20, 1977 [LU] Luxembourg .......................... 78152

[51] Int. Cl.³ ............................................. B23K 11/10
[52] U.S. Cl. ................................. 219/86.41; 219/91.1; 219/110
[58] Field of Search ............... 219/86.41, 86.51, 86.61, 219/91.1, 110; 324/207, 208; 33/143 F

[56] References Cited

U.S. PATENT DOCUMENTS

| | | | |
|---|---|---|---|
| 2,851,583 | 9/1958 | Sciaky | 219/86.41 |
| 3,135,853 | 6/1964 | Goodrich et al. | 219/86.61 X |
| 3,417,221 | 12/1968 | Hayward | 219/86.41 X |
| 3,876,854 | 4/1975 | Andrew et al. | 219/91.1 |
| 4,028,522 | 6/1977 | Chihoski et al. | 219/109 |
| 4,179,597 | 12/1979 | Bartholet | 219/86.51 X |

Primary Examiner—Gene Z. Rubinson
Assistant Examiner—Keith E. George
Attorney, Agent, or Firm—Holman & Stern

[57] ABSTRACT

One or two sensors are used to measure the displacement of a pair of electrodes relative to each other during resistance welding. The axis of the or each sensor is parallel to and as close as possible to the common alignment axis of the electrodes.

3 Claims, 3 Drawing Figures

ELECTRODE DISPLACEMENT MONITORING IN RESISTANCE WELDING

FIELD OF THE INVENTION

The present invention relates to apparatus for "monitoring" the welding of products, such as steel bar, steel sheet, and even certain steel sections.

BACKGROUND OF THE INVENTION

The aim is to enable the quality of welding to be monitored while welding is actually being carried out, and thus to enable the welding conditions to be immediately modified so as to improve the quality of welding if this is seen to be defective.

For achieving this aim I have already proposed an apparatus, more specifically a sensor (preferably an induction sensor) by means of which the relative displacement of welding electrodes can be measured as a function of time, that is to say either the penetration of the bars into one another or the expansion of the sheets at the welding point can be measured by this sensor. The curve thus obtained can be considered as the physical result of interaction of the various operating values (current strength, force at the electrodes, welding time) and, on this basis, as a genuine output value on which any regulation of the welding process can be based.

I have also proposed equipment which comprises, considered singly or in combination:

a sensor by means of which the electrical energy dissipated during the welding operation can be measured as a function of time, a sensor by means of which the pressure applied to the two welding electrodes can be measured, as a function of time, by any suitable means a sensor by means of which the speed of relative movement of the electrodes can be measured, as a function of time, that is to say by means of which it is possible to measure either the speed of penetration of steel bars into one another or the speed of expansion of sheet steels at the welding point.

The results obtained with this equipment have been found to be very satisfactory but, in certain cases, the installation of the movement sensor entails difficulties either due to the large amount of space occupied or by reason by disturbances in the measurement carried out.

Underlying the present invention is the object of providing an apparatus by means of which these drawbacks can be remedied.

SUMMARY OF THE INVENTION

The apparatus of the present invention, for monitoring the operations of a welding machine—which is principally composed of an approximately U-shaped frame, of at least one pair of connection electrodes, together with means for supplying these electrodes with electrical energy and with means for applying pressure to these electrodes, each pair of electrodes comprising at least one sensor, which is preferably constituted by an induction coil by means of which the relative displacement of the electrodes can be measured, as a function of time, during welding—is characterised in that the axis along which the movement is measured by the sensor is parallel to the axis of alignment of the upper and lower electrodes concerned, and the distance between the axis of the sensor and the said alignment axis of the electrodes concerned is as small as possible.

If there is a single sensor per pair of electrodes, one may be ensured that the distance between the axis of the sensor and the alignment axis of the electrodes concerned will be as small as possible by connecting the sensor, which is fast with one electrode, to the other electrode through the intermediary of a frame having two elements which lie substantially perpendicularly to the alignment axis of these electrodes and are interconnected by a longitudinal element skirting the frame of the welding machine at the greatest possible distance from the electrodes.

It is to be observed that a frame of this kind may be the seat of vibrations which, when they have a component parallel to the alignment axis of the electrodes, are the cause of significant errors in the measurement of the relative movement of the electrodes. Accordingly, it is advantageous with a view to eliminating any chance of error, if the frame has high rigidity in the direction of movement of the electrodes and, also, is equipped with a compression system acting perpendicularly to the direction of the said electrodes, against which the said frame bears, so as to thereby eliminate any possibility of spurious or parasitic displacement of the said frame.

If there are two displacement measuring sensors per pair of electrodes, each sensor is fast with an electrode and effects measurement of displacement of an electrode relative to a fixed point, the relative displacement of the two electrodes being the difference between these two measurements.

If such provisions are adopted, it will be ensured that there will be no obstruction in the vicinity of the electrodes, which is of particular value in instances where sheet steel components of large size are to be welded, and it is thus ensured that no disturbances will be caused to the measurements due to the axes of the electrodes being misaligned with each other.

DESCRIPTION OF PREFERRED EMBODIMENTS

Figure 1:
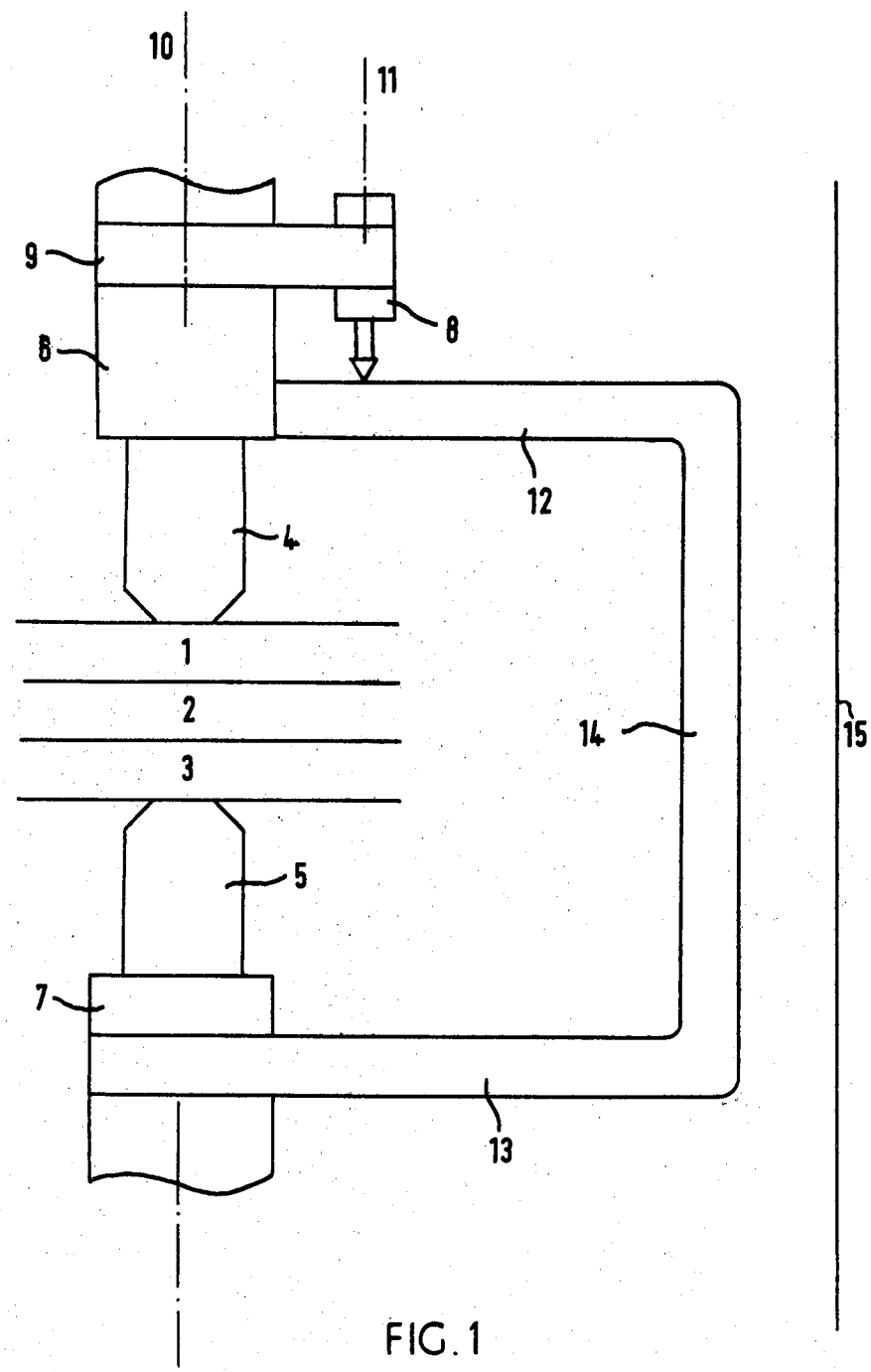
FIG. 1 diagrammatically illustrates a resistance welding machine in which a single displacement measuring sensor is used per pair of electrodes.

Referring first to FIG. 1, three sheet metal elements 1, 2, 3 are welded together by means of electrodes 4 and 5, shown with their respective electrode holders 6 and 7. A sensor 8, serving to measure relative displacement of the electrodes, is fixed to the electrode holder 6 by a strap 9 and is arranged in such a way that the distance between the axis 10 of alignment of the electrodes 4 and 5 and the axis 11 of the sensor 8 is as small as possible and in such a way that these axes 10, 11 are mutually parallel. The sensor 8 is connected to the other electrode holder 7 through the intermediary of a U-frame, whose two shanks 12 and 13 extend substantially perpendicular to the axis 10 of alignment of the electrode, the element 14 bridging and interconnecting the two shanks 12 and 13 skirting the frame 15 of the welding machine as far away as possible from the electrodes.

Figure 2:
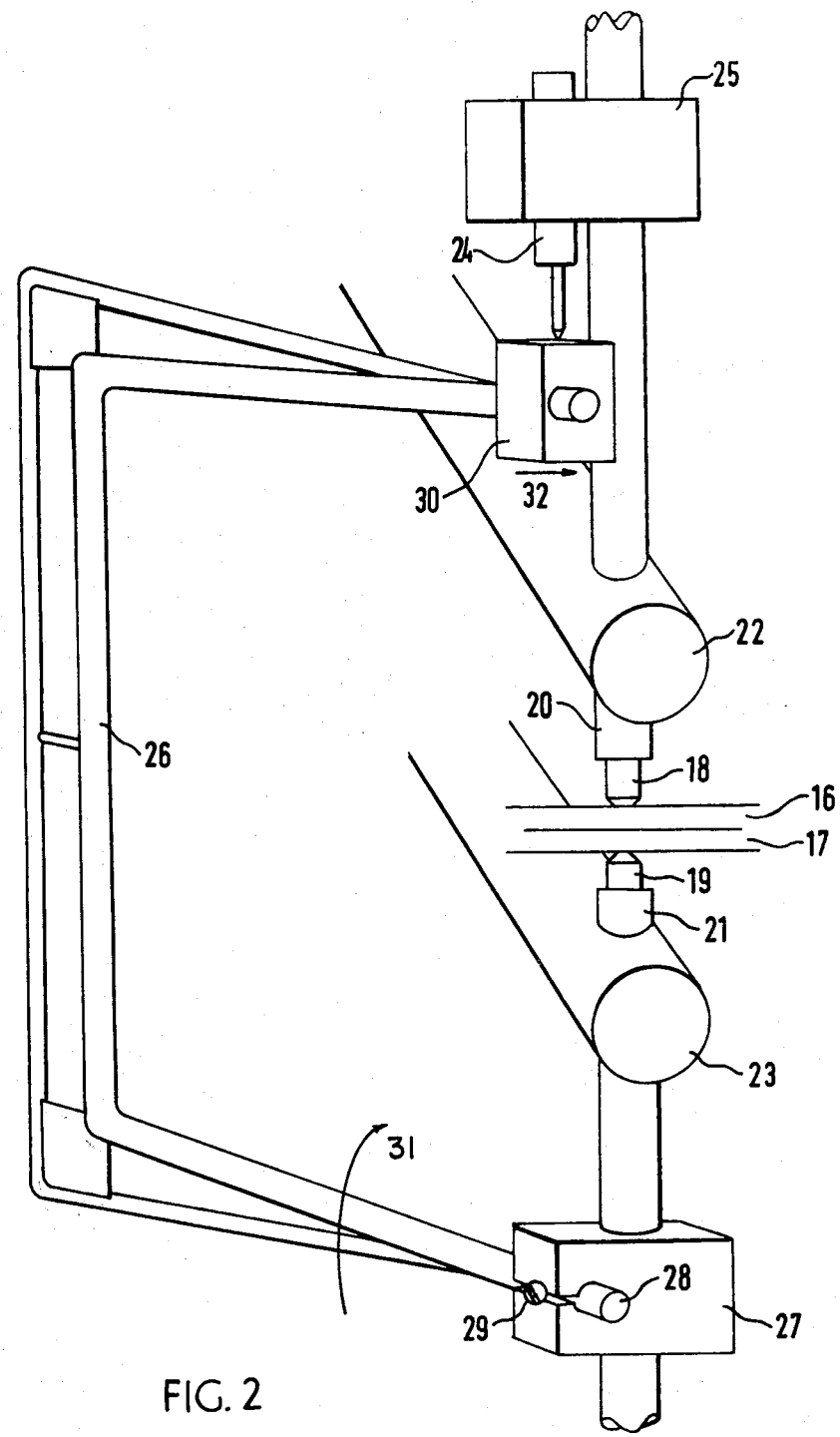
FIG. 2 diagrammatically illustrates an embodiment similar to that of FIG. 1 but with the addition of an anti-vibration frame.

In the arrangement shown in FIG. 2, two sheet metal elements 16 and 17 are welded together by means of electrodes 18 and 19, which are shown with their associated electrodes holders 20 and 21 respectively and with supports 22 and 23 respectively of the electrode holders 20 and 21. A sensor 24, used for measuring relative displacement of the electrodes 18 and 19 is fixed to electrode 18 by way of a support 25, the support 22, and the electrode holder 20, and is also fixed to the electrode 19 by way of an anti-vibration frame 26, a support 27 used for securing the frame 26 in place, the support 23, and the electrode holder 21.

The frame 26 is of tubular construction and is characterised by its lightness and by its high degree of rigidity in the direction of movement of the electrodes 18 and 19. The lower end of frame 26 is received in a recess 28 in the support 27 and is secured in place by means of a retaining system 29. The upper end of frame 26 bears against the electrode holder 20 through the intermediary of an element 30 made of an insulating material (Teflon for example) which functions with low friction. In this way any spurious or parasitic movement of the frame 26 is eliminated. The compression component of the frame 26 is constituted by the torque indicated in the drawing by arrow 31. This torque is applied as soon as the frame is locked in the retaining system 29. This torque, applied to the lower end of the frame, results in a compression force, indicated by arrow 32, being applied between the element 30 at the upper end of frame and electrode holder 20. This compression force opposes any spurious or parasitic movement of the upper end of the frame relative to the electrode holder 20.

Figure 3:
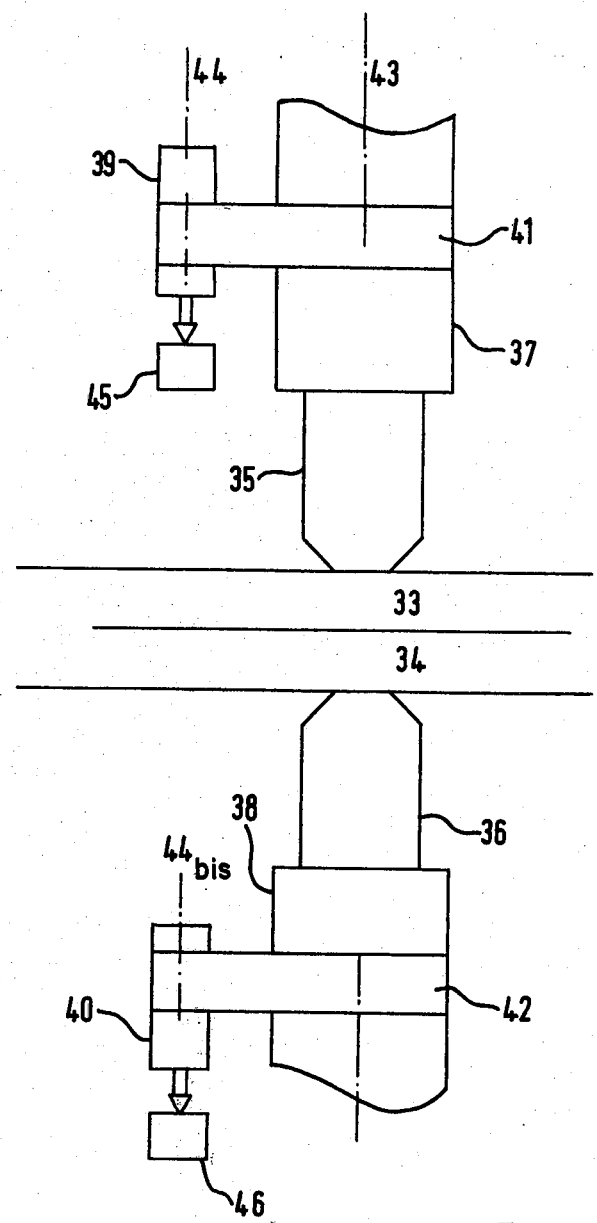
FIG. 3 diagrammatically illustrates an embodiment in which two displacement measuring sensors are used per pair of electrodes.

In the arrangement shown in FIG. 3, two sheet metal elements 33 and 34 are welded together by means of electrodes 35 and 36, which are shown with their associated electrode holders 37 and 38 respectively. Sensors 39 and 40, serving to measure relative movement of the electrodes, are fixed to the associated electrode holders 37 and 38 respectively through the intermediary of straps 41 and 42 respectively, so that the distances between the alignment axis 43 of the electrodes and the axes 44 and 44bis of the sensors 39 and 40 are as small as possible, while the axis 43 is parallel to the axes 44 and 44bis. The sensor 39 measures movement of electrode 35 relative to a fixed point 45, and the sensor 40 carries out the same measurement for movement of electrode 36 relative to a fixed point 46. A value for relative displacement of the two electrodes 35 and 36 is obtained by the difference between the two measurement values.

I claim:

1. In combination with a resistance welding machine comprising a main welding machine frame structure supporting a pair of first and second electrodes having a common alignment axis, apparatus for monitoring the operation of the welding machine, the apparatus comprising:

a single sensor for measuring displacement of the electrodes relative to each other during welding, the sensor having an axis along which the said displacement is measured, the said axis of the sensor and said common alignment axis of the electrodes being mutually parallel, the distance between the said axes being sufficiently small to render negligible any inadvertent small variation in parallelism between said sensor axis and said common alignment axis, wherein said single sensor is fixed to the first electrode, the apparatus further comprising a second frame member, separate from said main frame structure and having two transverse elements, which are substantially perpendicular to the said alignment axis, and a longitudinal element interconnecting the transverse elements, one of the transverse elements being fixed to the second electrode, the other of the transverse elements being connected to the sensor, the longitudinal element being spaced from the electrodes by a distance which is only slightly less than the spacing between the electrodes and the main welding machine frame.

2. Apparatus as claimed in claim 1, in which the frame has high rigidity in the direction of movement of the electrodes, the apparatus further comprising means for compressing the second frame member perpendicularly to the alignment axis towards the first electrode, against which the second frame member bears, in order to prevent undesirable movement of the frame.

3. Apparatus as claimed in either of claims 1 or 2, in which the sensor comprises an induction coil.

* * * * *